United States Patent
Namiki (10) Patent No.: US 9,199,379 B2
(45) Date of Patent: Dec. 1, 2015

(54) ROBOT SYSTEM DISPLAY DEVICE

(71) Applicant: FANUC CORPORATION, Minamitsuru-gun, Yamanashi (JP)

(72) Inventor: Yuuta Namiki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/104,511

(22) Filed: Dec. 12, 2013

(65) Prior Publication Data

US 2014/0188274 A1 Jul. 3, 2014

(30) Foreign Application Priority Data

Dec. 28, 2012 (JP) ................................. 2012-287342

(51) Int. Cl.
*B25J 9/16* (2006.01)

(52) U.S. Cl.
CPC .............. *B25J 9/1692* (2013.01); *B25J 9/1697* (2013.01)

(58) Field of Classification Search
CPC .................. A61B 19/5225; A61B 2019/5229; A61B 19/5244; A61B 2019/5246; A61B 2019/5255–2019/5257; A61B 2019/5289–2019/5291; A61B 2019/223; G06T 7/0014; G06T 7/0018; G06T 7/002; G06T 7/0022–7/0026; G06T 7/004–7/0046; G06T 15/20; Y10S 901/46; Y10S 901/47; Y10S 901/50; B25J 9/1689–9/1692; B25J 9/1697; B25J 19/023; B25J 9/1605; B25J 19/02–19/025; B25J 19/04
See application file for complete search history.

(56) References Cited

U.S. PATENT DOCUMENTS

| | | | | |
|---|---|---|---|---|
| 6,078,329 A | * | 6/2000 | Umeki et al. | 345/419 |
| 6,330,356 B1 | * | 12/2001 | Sundareswaran et al. | 382/154 |
| 6,597,971 B2 | | 7/2003 | Kanno | |
| 7,155,316 B2 | * | 12/2006 | Sutherland et al. | 700/248 |
| 7,233,841 B2 | * | 6/2007 | Sadighi et al. | 700/245 |
| 7,298,385 B2 | * | 11/2007 | Kazi et al. | 345/633 |
| 2007/0188501 A1 | * | 8/2007 | Yee et al. | 345/473 |
| 2009/0177081 A1 | * | 7/2009 | Joskowicz et al. | 600/426 |
| 2010/0039506 A1 | * | 2/2010 | Sarvestani et al. | 348/65 |
| 2010/0157041 A1 | * | 6/2010 | Klaiman et al. | 348/77 |
| 2010/0239121 A1 | * | 9/2010 | Meier | 382/103 |
| 2010/0289797 A1 | * | 11/2010 | Tateno et al. | 345/419 |
| 2012/0078236 A1 | * | 3/2012 | Schoepp | 606/1 |
| 2012/0203067 A1 | * | 8/2012 | Higgins et al. | 600/117 |
| 2012/0237085 A1 | * | 9/2012 | Meier | 382/103 |
| 2013/0250081 A1 | * | 9/2013 | Pandey | 348/77 |

FOREIGN PATENT DOCUMENTS

| | | |
|---|---|---|
| EP | 2033747 | 3/2009 |
| JP | 04-035885 | 2/1992 |

(Continued)

OTHER PUBLICATIONS

"An Efficient and Accurate Camera Calibration Tecnique for 3D Machine Vision," Proc. Computer Vision and Pattern Recognition '86, pp. 368-374, 1986.

*Primary Examiner* — Bao Long T Nguyen
(74) *Attorney, Agent, or Firm* — RatnerPrestia (57) ABSTRACT

A robot system display device is provided for graphically displaying components of a robot system which carries out a desirable process by measuring a position of a target object with a vision sensor. The robot system display device acquires an arrangement of the vision sensor relative to other components of the robot system based on calibration data for the vision sensor and pre-stored shape information of the vision sensor. The robot system display device graphically displays the vision sensor in a virtual space based on the relative arrangement.

8 Claims, 9 Drawing Sheets

(56) References Cited

FOREIGN PATENT DOCUMENTS

| JP | 05-241626 | 9/1993 |
|----|-----------|--------|
| JP | 2005-135278 | 5/2005 |
| JP | 2009-006452 | 1/2009 |
| JP | 2009-012106 | 1/2009 |
| JP | 2009-175954 | 8/2009 |
| JP | 5003840 | 8/2012 |

* cited by examiner

ROBOT SYSTEM DISPLAY DEVICE

BACKGROUND OF THE INVENTION

1. Field of the Invention

The present invention relates to a robot system display device for graphically displaying a robot system in order to check an arrangement relationship among a robot, peripheral equipment, and a vision sensor.

2. Description of the Related Art

There are known robot systems configured such that a robot performs work such as handling or shaping a target object based on positional information of the target object detected by a vision sensor. Vision sensors are used in various configurations in which, for example, they are disposed near a hand of the robot or on a fixed structure such as a support stand. In any case, it is necessary to identify an arrangement relationship between the vision sensor and the robot. For this purpose, it is necessary to define a relationship between a robot coordinate system as a reference for an operation control of a robot and a vision sensor coordinate system as a reference for a measurement process by way of a vision sensor. Such a process for associating different coordinate systems with each other is generally referred to as calibration of a vision sensor. The associative information obtained as a result of such calibration is referred to as calibration data.

JP-A-5-241626 discloses an exemplary calibration process for a sensor attached to a movable unit of a robot. According to this known technique, in order to calibrate a sensor before and after movement of the sensor, calibration data after the movement of the sensor is calculated based on calibration data before the movement and a movement amount of the sensor.

JP-A-4-35885 discloses a technique of calibrating of a vision sensor by using a patterned plate that is attached to a robot arm and provided with a predetermined pattern is formed. According to this known technique, it is necessary to set information such as a mounting dimension of the patterned plate beforehand. Therefore, if the information set is incorrect, inaccurate calibration data will be obtained. Not only the case of this known technique, other techniques involve setting information such as dimensions of components may be employed. Accordingly, if the information setting is inaccurate, appropriate calibration will not be carried out.

JP-A-2005-135278 discloses a simulation device for a robot system including a vision sensor and a robot. The simulation device in this known technique is used for evaluating an operation program that is created off-line. Arrangement information of the vision sensor consists of predefined values corresponding to a robot system to be simulated. Therefore, the simulation device is not designed to find an error in the calibration data for the vision sensor.

As described above, according to the conventional techniques, it is difficult to find an error in calibration data of a vision sensor even if one exists. Thus, there is a need for a robot system display device that facilitates identifying an error in calibration data for a vision sensor.

SUMMARY OF THE INVENTION

According to a first aspect of the present application, a robot system display device comprising: a storage unit for storing shape information and arrangement information of components of a robot system; and a display unit for graphically displaying the components of the robot system based on the shape information and the arrangement information of the components stored by the storage unit, wherein the robot system at least comprises a robot and a vision sensor, wherein the robot system display device further comprises: a first acquisition unit for acquiring calibration data for associating a robot coordinate system which is a reference for an operation control of the robot and a vision sensor coordinate system which is a reference for a measurement process of the vision sensor with each other; and a second acquisition unit for acquiring arrangement information of the vision sensor based on the calibration data acquired by the first acquisition unit and shape information of the vision sensor stored by the storage unit, wherein the display unit is adapted to display the vision sensor, based on the shape information of the vision sensor stored by the storage unit and the arrangement information of the vision sensor acquired by the second acquisition unit, is provided.

According to a second aspect of the present application, in the robot system display device according to the first aspect, the vision sensor is fixed to an arm of the robot so as to move together with the arm and maintain an arrangement relationship with the arm, wherein the display unit is adapted to graphically display the vision sensor based on the arrangement relationship between the arm and the vision sensor.

According to a third aspect of the present application, in the robot system display device according to the first or second aspect, the robot system further comprises a vision target jig, wherein the first acquisition unit is adapted to acquire calibration data for associating the robot coordinate system, the vision sensor coordinate system and the vision target jig with one another, and wherein the robot system display device further comprises a third acquisition unit for acquiring arrangement information of the vision target jig based on the calibration data, and wherein the display unit is adapted to graphically display the vision target jig, based on shape information of the vision target jig stored by the storage unit and the arrangement information of the vision target jig acquired by the third acquisition unit.

According to a fourth aspect of the present application, in the robot system display device according to the third aspect, the vision target jig is fixed to an arm of the robot so as to move together with the arm of the robot and maintain an arrangement relationship with the arm, and wherein the display unit is adapted to graphically display the vision target jig based on the arrangement relationship between the arm and the vision target jig.

According to a fifth aspect of the present application, in the robot system display device according to any one of the first to fourth aspects, the shape information of the components of the robot system stored by the storage unit is three-dimensional shape information.

According to a sixth aspect of the present application, the robot system display device according to any one of the first to fifth aspects further comprises a vision sensor control device for controlling the vision sensor.

According to a seventh aspect of the present application, the robot system display device according to any one of the first to sixth aspects further comprises a robot control device for controlling the robot.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described with reference to the accompanying drawings. The illustrated elements may be modified in size in relation to one another for better understanding of the present invention.

Figure 1:
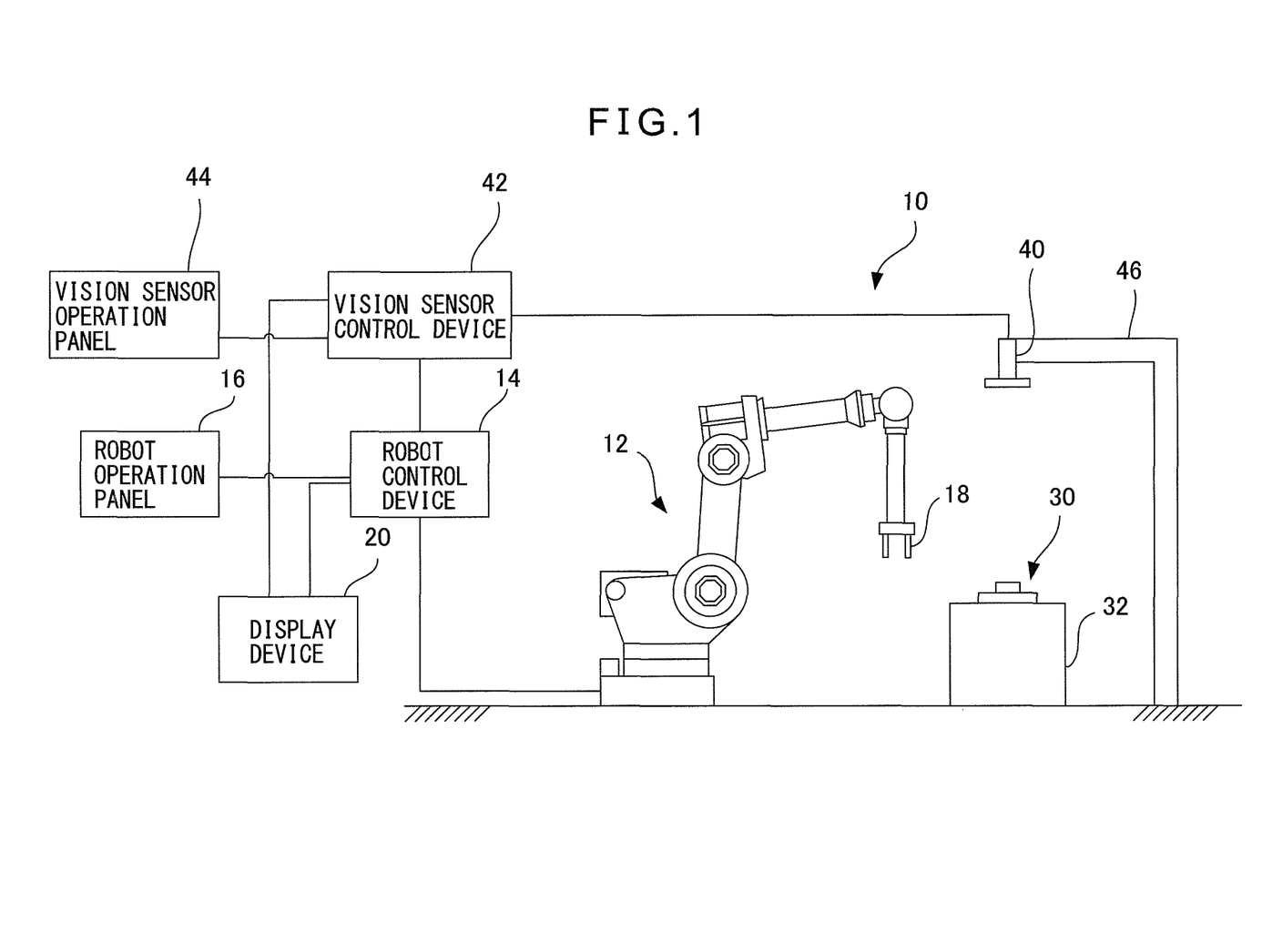
FIG. 1 is a diagram depicting a configuration of a robot system and a display device for the robot system according to a first embodiment.

FIG. 1 is a diagram depicting a configuration of a robot system 10 and a display device 20 for the robot system 10 according to a first embodiment. The robot system 10 includes: a robot 12; a robot control device 14 for controlling the robot 12; a robot operation panel 16 for operating the robot control device 14; a target object 30; a table 32 on which the target object 30 is placed; a vision sensor 40 for acquiring an image of the target object 30; a vision sensor control device 42 for controlling the vision sensor 40; a vision sensor operation panel 44 for operating the vision sensor control device 42; and a vision sensor support stand 46 for fixing the vision sensor 40 in position.

Since the target object 30 on the table 32 is not positioned, a position of the target object 30 is unknown. An image of the target object 30 is taken by an image sensing element of the vision sensor 40 such as a camera. A position of the target object 30 is measured through image processing of the image of the target object 30 by the vision sensor control device 42. Movement of the robot 12 is controlled based on the positional information of the target object 30 which is measured by the vision sensor control device 42. In this way, the robot 12 can carry out a desired operation for the target object 30 in accordance with the position of the target object 30.

The robot 12 is any known robot manipulator (hereinafter simply referred to as "robot"), and is not limited to a robot having a particular configuration. Although the robot 12 in the illustrated embodiment is provided at a tip of its arm with a hand 18 for holding the target object 30, other various end effectors may also be applied thereto, depending on the application including, but not limited to, welding and painting.

The vision sensor 40 is a known sensor which includes, for example, image sensing means such as an industrial charge-coupled device (CCD) camera. The vision sensor 40 is attached to the vision sensor support stand 46 and arranged in a predetermined position relative to the table 32 in order to obtain an image of the target object 30.

Figure 2:
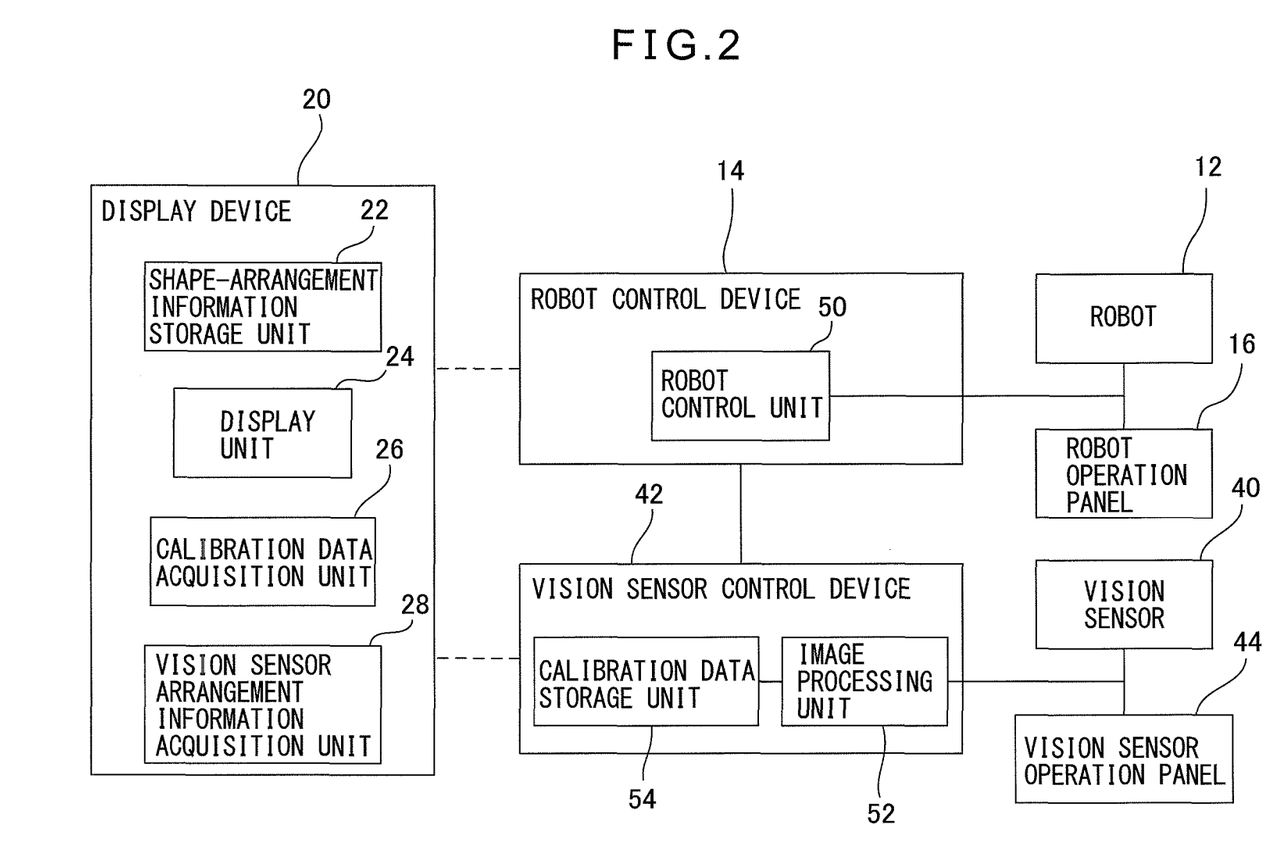
FIG. 2 is a functional block diagram of the robot system and the display device for the robot system according to the first embodiment.

FIG. 2 is a functional block diagram of the robot system 10 and the display device 20 for the robot system 10 according to the first embodiment. The robot control device 14 is a digital computer including a robot control unit 50. The robot control unit 50 generates a command for controlling movement of the robot 12 and outputs the command to the robot 12. The robot operation panel 16 is connected to the robot control device 14 via a communication cable and is used to operate the robot 12. The robot operation panel 16 has a user interface including, but not limited to, buttons, a key board, a mouse, a dial and a touchscreen.

The vision sensor control device 42 is a digital computer including an image processing unit 52 and a calibration data storage unit 54. The image processing unit 52 and the calibration data storage unit 54 are connected to each other via a bus. The vision sensor operation panel 44 is connected to the vision sensor control device 42 via a communication cable and is used to set various conditions necessary to measure a position of the target object 30 by using the vision sensor 40. The vision sensor 40 is connected to the image processing unit 52. The image processing unit 52 processes image data acquired by the vision sensor 40 to calculate a position of the target object 30 contained in the image. The calibration data storage unit 54 stores calibration data obtained as a result of calibration, and data related to the calibration.

The robot control device 14 and the vision sensor control device 42 are connected to each other via a communication cable, allowing for transmission/receipt therebetween. The communication may be based on RS-232C or a local area network (LAN). Alternatively, the communication may be based on a wireless LAN without using a communication cable. Data transmitted and received between the robot control device 14 and the vision sensor control device 42 include, but not limited to, positional information of the target object 30 measured by the vision sensor control device 42, and current positional information of the robot 12 obtained by the robot control device 14.

The display device 20 is a digital computer such as a personal computer or a work station, which includes: a shape-arrangement information storage unit 22; a display unit 24, such as a liquid crystal display, for graphically displaying components of the robot system 10; a calibration data acquisition unit 26 for reading out and acquiring calibration data from the calibration data storage unit 54; and a vision sensor arrangement information acquisition unit 28 for acquiring the arrangement information of the vision sensor 40. The display device 20 is designed to acquire necessary information from the vision sensor control device 42 and the robot control device 14 via communication or a recording medium. For example, the display device 20 acquires the calibration data stored in the calibration data storage unit 54 of the vision sensor control device 42, or the current positional information of the arm tip of the robot 12 which is obtained by the robot control device 14, or angular information of the respective movable axes of the robot 12.

The shape-arrangement information storage unit 22 stores shape information and arrangement information of the components of the robot system 10. The components of the robot system 10 include, but not limited to, the robot 12, the vision sensor 40 and the vision sensor support stand 46. The shape information may be precise shape data of the components, e.g., in the form of computer-aided design (CAD) data, or may be data roughly representing positions and postures of the components in the form of a simplified model of a cube or the like. The shape information of the respective components may be represented in any form. The shape information may be two-dimensional shape information or three-dimensional shape information. For example, a reference coordinate system as a reference for a component is defined, and apices, lines, planes or the like are specified in the reference coordinate system to identify the shape of the component. In such a case, the position and posture of the reference coordinate system of the component relative to a world coordinate system may be used as the arrangement information of the component.

Similarly as other components, a reference coordinate system is also defined for the robot 12, and the shape information of the robot 12 is specified in its reference coordinate system. Since the robot 12 generally has a plurality of movable axes, the reference coordinate system of the robot 12 is usually defined based on a base end side, i.e., a stationary part, of the robot 12. The shape (or the posture) of the robot 12 displayed by the display device 20 depends on the angles of the respective movable axes at the time of displaying.

The same coordinate system as a robot coordinate system that is a reference for the operation control of the robot 12 may be used as the reference coordinate system for specifying the shape of the robot 12. In order to simplify the explanation, the case where the aforementioned two coordinate systems are identical will be described. In such case, the arrangement information of the robot 12 can be obtained as a position in the robot coordinate system relative to the world coordinate system. In the case of the robot system 10 which includes only a single robot 12, the robot coordinate system may be defined as the world coordinate system. In this case, the position of the robot 12 corresponds to a position of the origin in the world coordinate system.

The shape information and the arrangement information of the respective components may be obtained by reading out by the display device information which has been created in advance by using a CAD system or an off-line programming system. The shape information and arrangement information may also be directly created by the display device 20. In any case, the obtained shape information and arrangement information of the respective components is stored in the shape-arrangement information storage unit 22 of the display device 20.

The display unit 24 of the display device 20 graphically displays the components of the robot system 10, such as the robot 12, the hand 18, the table 32, the target object 30 and the vision sensor support stand 46, in a virtual three-dimensional space based on the shape information of the components of the robot system 10 and the arrangement information of those components stored in the shape-arrangement information storage unit 22.

Although the shape information of the vision sensor 40 is stored in the shape-arrangement information storage unit 22, the arrangement information of the vision sensor 40 is not stored therein. According to the present embodiment, the arrangement information of the vision sensor 40 is calculated in accordance with a process which will be described below, based on the calibration data for the vision sensor 40. Therefore, the vision sensor 40 is not contained in an image displayed by the display unit 24 until the calibration of the vision sensor 40 is completed.

The calibration data storage unit 54 of the vision sensor control device 42 stores the calibration data for associating the robot coordinate system as a reference for an operation control of the robot 12 and a vision sensor coordinate system as a reference for a measurement process carried out by the vision sensor 40 with each other.

There have been various techniques in relation to the type of calibration data and a manner in which calibration data is obtained. However, the present invention is not limited to any specific type or manner with respect to the calibration data. A calibration method for a camera is described in, for example, "Roger Y. Tsai, '*An efficient and accurate camera calibration technique for 3d machine vision,*' *Proc. Computer Vision and Pattern Recognition* '86, pp. 368-374, 1986."

Calibration data for a vision sensor generally contains external parameters and internal parameters. The external parameters are pieces of information related to a physical position and posture of the vision sensor, and may be represented as, for example, arrangement information of the vision sensor coordinate system relative to the robot coordinate system. On the other hand, the internal parameters are pieces of information related to conditions of the optical system of the vision sensor, such as a focal distance of a lens, a lens distortion, and a dimension of a light receiving element.

Similarly as other components, a reference coordinate system is also defined for the vision sensor as a reference for specifying the shape of the vision sensor. However, the vision sensor coordinate system which is used as a reference for a measurement process by the vision sensor may be identical to the reference coordinate system for representing the shape of the vision sensor. In this case, the external parameters contained in the calibration data are used as the arrangement information of the vision sensor. On the other hand, in the case where the reference coordinate system of the vision sensor differs from the vision sensor coordinate system, a relationship between the reference coordinate system defined for the vision sensor and the vision sensor coordinate system is already known, and therefore the arrangement information of the vision sensor can be calculated based on the external parameters contained in the calibration data and the relationship between those two coordinate systems. The relationship between the reference coordinate system of the vision sensor and the vision sensor coordinate system may be represented as a position and posture of the vision sensor coordinate system in the reference coordinate system of the vision sensor, and is stored as part of the shape information of the vision sensor in the shape-arrangement information storage unit 22.

Based on the thus calculated arrangement information of the vision sensor 40 and the shape information of the vision sensor 40, which is stored in advance in the shape-arrangement information storage unit 22, the display unit 24 of the display device 20 graphically displays the vision sensor 40 in a virtual three-dimensional space.

When the vision sensor is properly calibrated, the vision sensor is displayed on the display unit at a correct position in relation to other components such as the vision sensor support stand. In contrast, if the calibration for the vision sensor is improper, the vision sensor is displayed at a position different from the actual position. Thus, the robot system display device according to the present embodiment allows an operator to easily check, based on the graphical information displayed on the display unit, as to whether the vision sensor has been properly calibrated. Further, when an offline simulation device as disclosed in JP-A-2005-135278 is used, it is possible to acquire a highly reliable simulation result by reading out and using the calibration data that has been confirmed as being accurate with the aid of the display device according to the present embodiment.

Next, other embodiments will be described. In the following explanations, matters that have already been described will be omitted accordingly. Further, the same or corresponding elements are designated with the same reference numerals.

Figure 3:
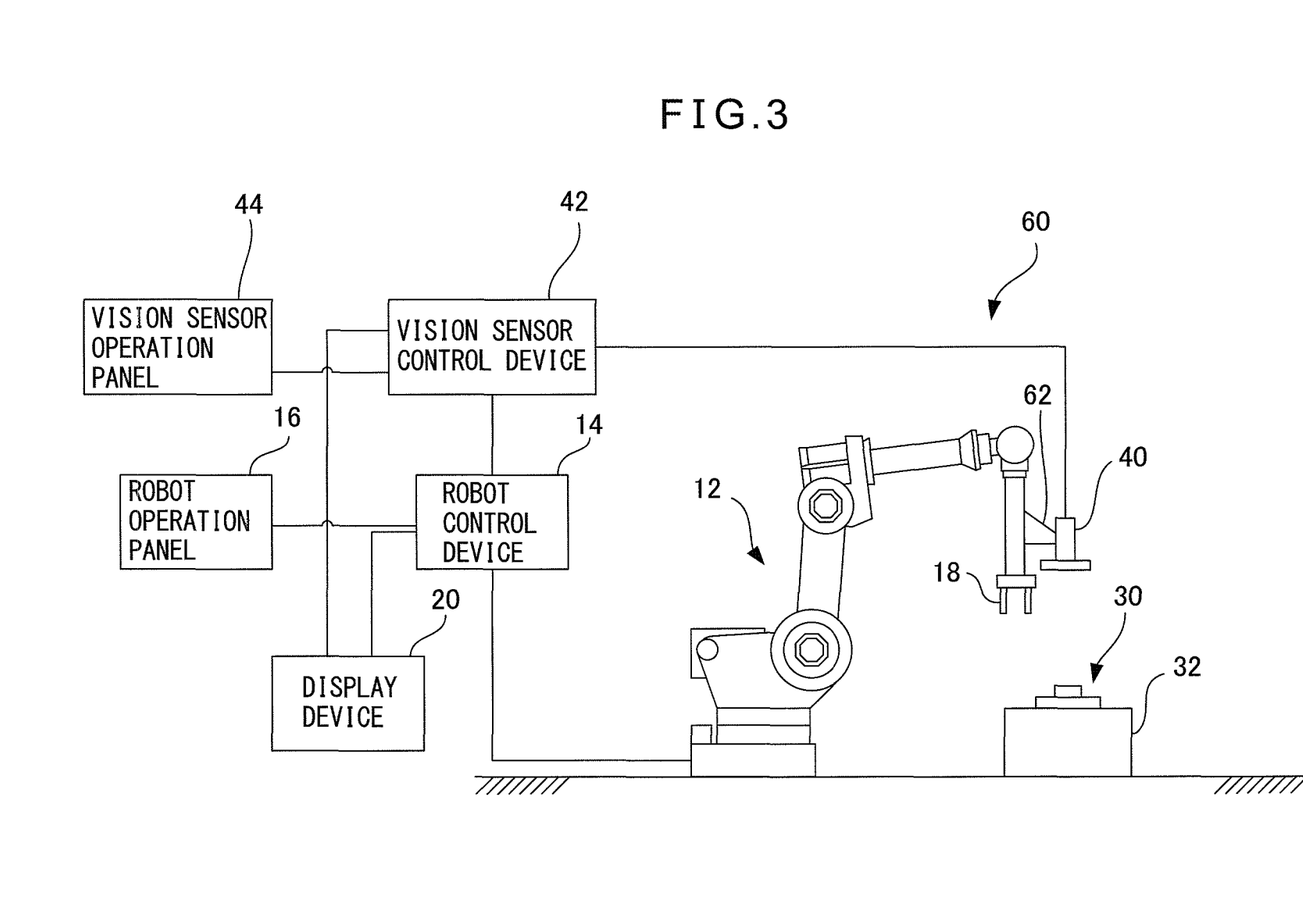
FIG. 3 is a diagram depicting a configuration of a robot system and a display device for the robot system according to a second embodiment.

FIG. 3 is a diagram depicting a configuration of a robot system 60 and a display device 20 for the robot system 60 according to a second embodiment. The configuration of the robot system 60 shown in FIG. 3 is basically the same as that of the robot system 10 according to the first embodiment, but different therefrom in that the vision sensor 40 is attached to an arm tip of a robot 12 by a bracket 62, rather than the vision sensor support stand 46. In other words, the vision sensor 40 is configured to move together with an arm of the robot 12 as the robot 12 is in movement. With this configuration, a positional relationship between the vision sensor 40 and the arm tip of the robot 12 is maintained.

In the present embodiment, the vision sensor 40 is calibrated, while the robot 12 is held still at a given position. For convenience of the explanation, "Q1" is defined as a position of the arm tip of the robot 12 in the robot coordinate system when the vision sensor is calibrated. The "Q1" is a 4×4 homogeneous transformation matrix specified in the robot coordinate system.

If the robot 12 remains still even after the vision sensor 40 is calibrated, arrangement information of the vision sensor 40 can be obtained by a similar way as in the first embodiment. However, in the present embodiment, a position and posture of the vision sensor 40 changes as the robot 12 is moved. Therefore, it may be necessary to obtain the arrangement information of the vision sensor 40 again after the position and posture of the vision sensor 40 is changed.

Accordingly, in the present embodiment, the position Q1 of the arm tip at the time of calibration is stored in the calibration data storage unit 54 as part of the calibration data. Where "P1" represents the arrangement information of the vision sensor 40 calculated from the calibration data acquired when the arm tip is at the position Q1, "Q2" represents the current position of the arm tip of the robot 12, and "P2" represents the current arrangement information of the vision sensor 40, since an amount of movement of the arm tip is equal to that of the vision sensor 40, a relationship among Q1, Q2, P1 and P2 satisfies the following equation (1):

$$Q2 \times Q1^{-1} = P2 \times P1^{-1} \quad (1),$$

where the position Q2 and the arrangement information P1 and P2 are 4×4 homogeneous transformation matrices similarly as Q1, and are specified in the robot coordinate system.

Q1 and P1 are calculated from the calibration data. Further, the current position Q2 of the arm tip of the robot 12 can be obtained from the robot control device 14. Therefore, the current arrangement information P2 of the vision sensor 40 can be calculated in accordance with the following equation (2):

$$P2 = Q2 \times Q1^{-1} \times P1 \quad (2).$$

Then, the vision sensor 40 is displayed again on the display unit 24 of the robot system display device 20, based on the current arrangement information P2 of the vision sensor 40 calculated by the above equation (2).

The above-described example may apply to the case where a vision sensor is calibrated in relation to the robot coordinate system, or in other words, where the external parameters of the calibration data represent a position of the vision sensor coordinate system relative to the robot coordinate system. However, in the case where the vision sensor is attached to the arm tip of the robot, the vision sensor may be calibrated in relation to a coordinate system affixed to the arm tip of the robot (hereinafter referred to as "tip coordinate system"). In the latter case, the external parameters of the calibration data represent data that associate the tip coordinate system and the vision sensor coordinate system with each other. The current arrangement information of the vision sensor can be calculated as follows:

"Pt" represents the arrangement information of the vision sensor 40 defined in the tip coordinate system. The arrangement information Pt is also a 4×4 homogeneous transformation matrix, similarly as Q2. The arrangement information Pt is calculated from the calibration data stored in the calibration data storage unit 54. The current position Q2 of the arm tip of the robot 12 may be obtained from the robot control device 14. Therefore, the current arrangement information P2 of the vision sensor 40 viewed from the world coordinate system, for example, the robot coordinate system, can be calculated by the following equation (3):

$$P2 = Q2 \times Pt \quad (3).$$

Figure 4:
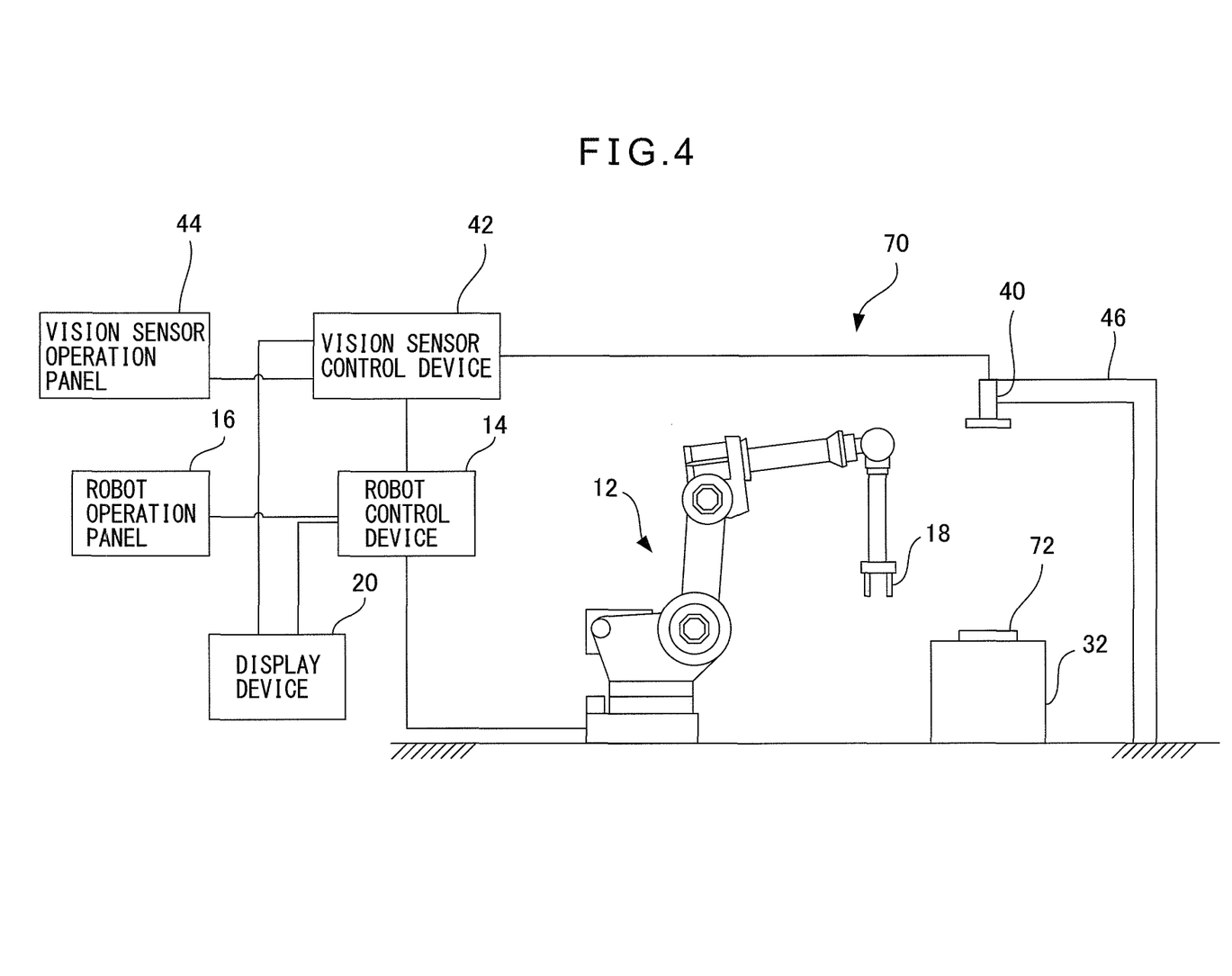
FIG. 4 is a diagram depicting a configuration of a robot system and a display device for the robot system according to a third embodiment.

FIG. 4 is a diagram depicting a configuration of a robot system 70 and a display device 20 for the robot system 70 according to a third embodiment. In the present embodiment, a vision target jig 72 is used to calibrate a vision sensor 40. Further, the vision target jig 72 is additionally displayed on a display unit 24 of the display device 20.

A calibration method for the vision sensor 40 using the vision target jig 72 is known as disclosed in JP-A-4-35885. Therefore, a detailed description on the calibration method will be omitted herein.

Figure 5:
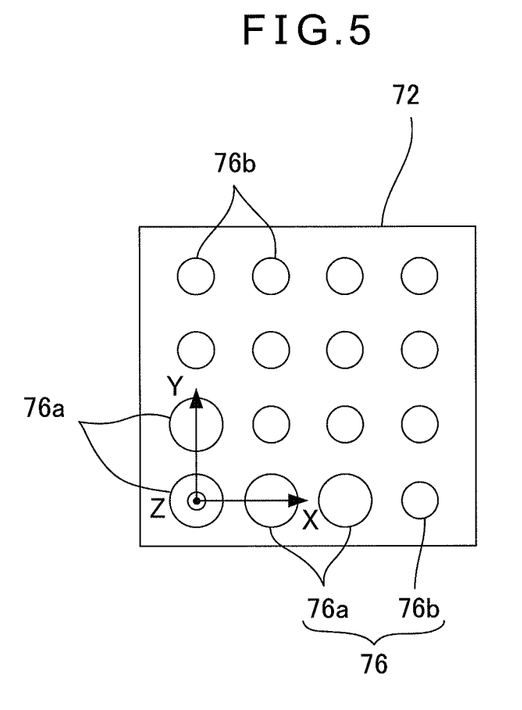
FIG. 5 is a diagram depicting an exemplary configuration of a vision target jig used in the third embodiment.

FIG. 5 is a diagram depicting an exemplary configuration of the vision target jig 72 which may be used in the present embodiment. The vision target jig 72 is provided with a dotted pattern 76 as shown in FIG. 5, which serves as a pattern to be recognized by the vision sensor 40. The dotted pattern 76 includes large sized dots (circles) 76a and small sized dots (circles) 76b arranged in a matrix form. Four large sized dots 76a are arranged in an L-shaped form, representing a coordinate system of the vision target jig 72 (hereinafter referred to as "vision target jig coordinate system"). Specifically, the center of the large sized dot 76a located at a corner of the vision target jig 72 corresponds to the origin of the vision target jig coordinate system; a direction in which three large sized dots 76a are arranged represents an X axis direction; a direction in which two large sized dots 76a are arranged represents a Y axis direction; and the vertically upper side of the surface of the vision target jig 72 represents a Z axis direction.

Similarly as other components, the shape information of the vision target jig 72 is information specified in a reference coordinate system applied to the vision target jig 72, and the information is stored in the shape-arrangement information storage unit 22 of the display device 20. In contrast, the arrangement information of the vision target jig 72 is not stored in the shape-arrangement information storage unit 22. According to the present embodiment, the arrangement information of the vision target jig 72 is calculated in a way which will be described below, based on the calibration data for the vision sensor 40. Therefore, the vision target jig 72 is not included in an image displayed on the display unit 24 of the display device 20 until the calibration of the vision sensor 40 is completed.

In order to calibrate the vision sensor 40 by using the vision target jig 72, it may be necessary to set in advance size information of the dotted pattern 76 formed on the vision target jig 72 used, such as information on intervals between the respective dots 76a and 76b, and placement information of the vision target jig 72, i.e., a position and posture of the vision target jig 72.

The size information of the dotted pattern 76 may be known from a design drawing or the like, which is used to form the dotted pattern 76 on the vision target jig 72. The size information of the dotted pattern 76 is stored in the calibration data storage unit 54 as part of the calibration data.

According to the present embodiment, the vision target jig 72 is fixed onto the table 32 such that the dotted pattern 76 is oriented toward the vision sensor 40. The placement information of the vision target jig 72 is represented by a position of the vision target jig coordinate system relative to the robot coordinate system which serves as a reference for the operation control of the robot 12. The placement information of the vision target jig 72 which has been set is stored in the calibration data storage unit 54 as part of the calibration data.

A positional relationship between the reference coordinate system of the vision target jig 72 which serves as a reference for identifying the shape of the vision target jig 72, and the vision target jig coordinate system is known information stored in the shape-arrangement information storage unit 22 as part of the shape information of the vision target jig 72. Therefore, the arrangement information of the vision target jig 72, i.e., the positional information of the vision target jig 72 in the robot coordinate system, can be calculated based on the placement information of the vision target jig 72 stored in the calibration data storage unit 54, and the positional relationship between the reference coordinate system of the vision target jig 72 and the vision target jig coordinate system.

The display device 20 of the robot system 70 graphically displays the vision target jig 72 in a virtual three-dimensional space, based on the obtained arrangement information of the vision target jig 72 and the shape information of the vision target jig 72 stored in the shape-arrangement information storage unit 22.

Figure 6:
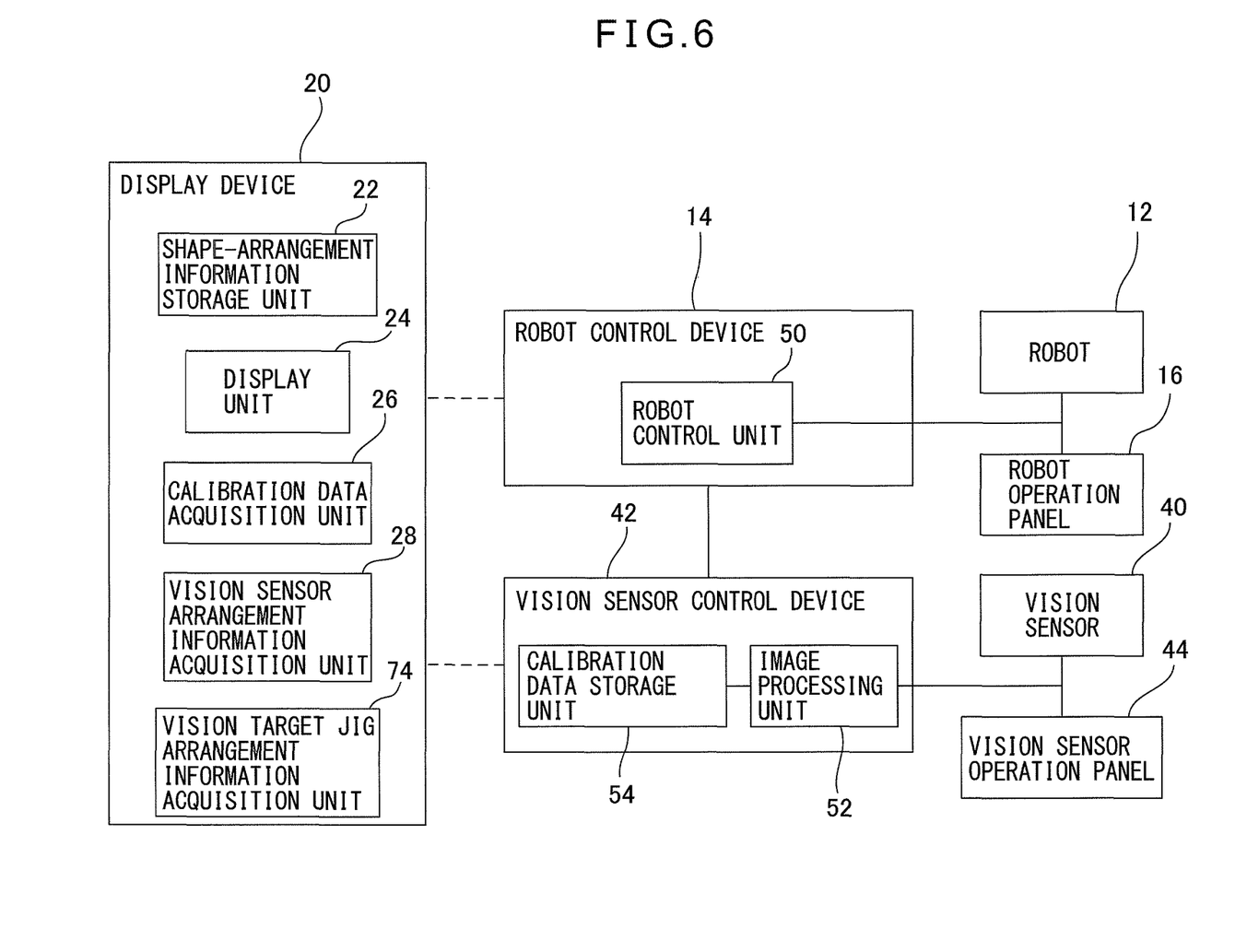
FIG. 6 is a functional block diagram of the robot system and the display device for the robot system according to the third embodiment.

FIG. 6 is a functional block diagram of the robot system 70 and the robot system display device 20 according to the third embodiment. The functional block diagram according to this embodiment is basically the same as the first embodiment, but different in that the display device 20 further includes a vision target jig arrangement information acquisition unit 74 for acquiring arrangement information of the vision target jig 72.

Although a process for calibrating the vision sensor fixed onto the vision sensor support stand has been described in relation to the present embodiment, the vision target jig may also be used for calibrating the vision sensor fixed onto the arm tip of the robot. In the latter case, the vision sensor is graphically displayed in accordance with the second embodiment, and the vision target jig is graphically displayed in accordance with the third embodiment.

Figure 7:
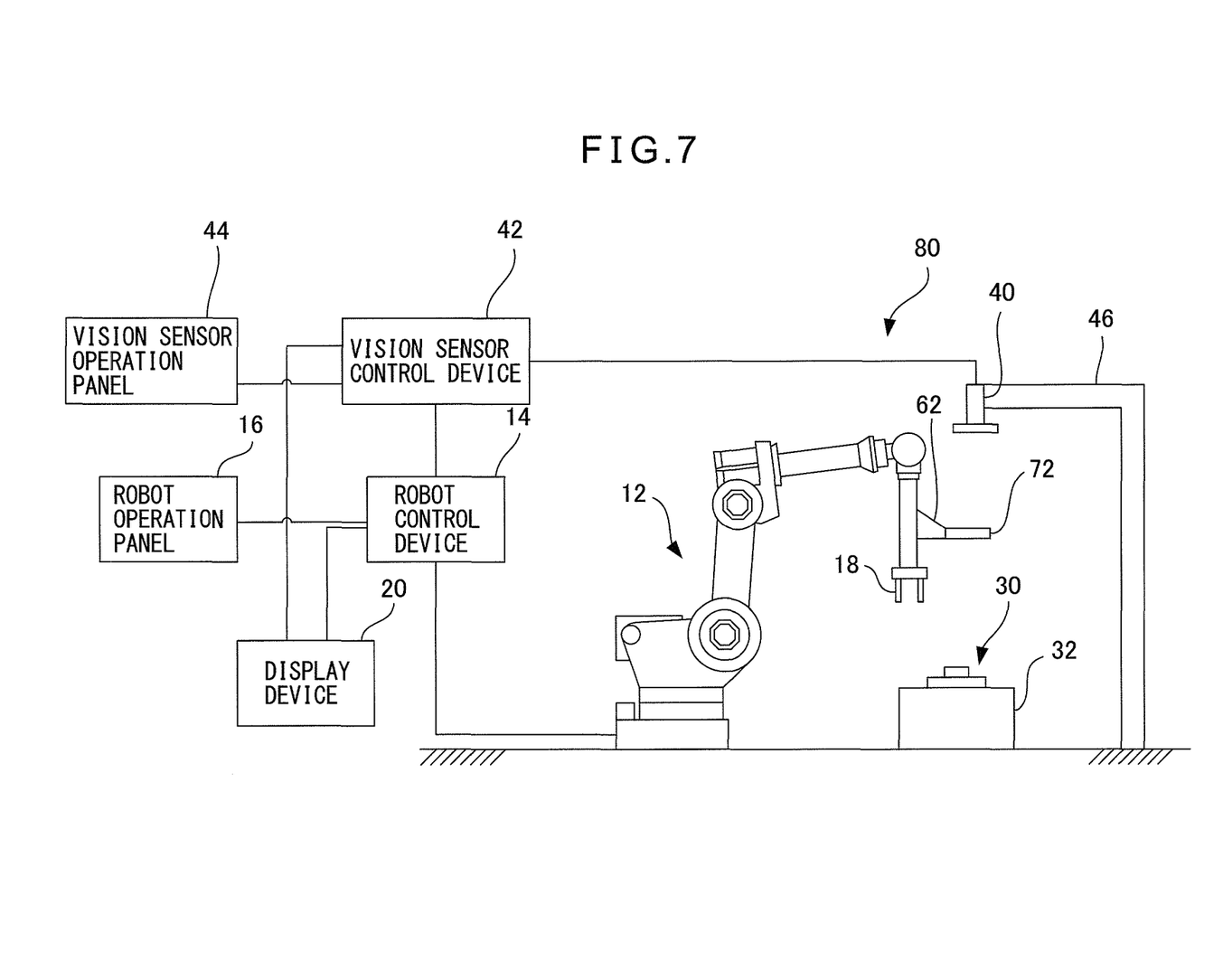
FIG. 7 is a diagram depicting a configuration of a robot system and a display device for the robot system according to a fourth embodiment.

FIG. 7 is a diagram depicting a configuration of a robot system 80 and a display device 20 for the robot system 80 according to a fourth embodiment. The configuration of the robot system 80 shown in FIG. 7 is basically similar to that of the robot system 70 described in relation to the third embodiment, but different therefrom in that the vision target jig 72 is placed to an arm tip of the robot 12 via a bracket 62, rather than on the table 32. In other words, the vision target jig 72 moves together with the arm of the robot 12 to maintain a position relative to the arm tip of the robot 12. The arm tip of the robot 12 may be moved to take an image of the dotted pattern 76 of the vision target jig 72 with the vision sensor 40.

In the case where the vision target jig 72 is placed at the arm tip of the robot 12, the position of the vision target jig coordinate system relative to the tip coordinate system is set as the placement information of the vision target jig 72. In other words, the placement information of the vision target jig 72 stored in the calibration data storage unit 54 constitutes the positional information of the vision target jig 72 in the tip coordinate system.

The placement information of the vision target jig 72 in the robot coordinate system changes as the arm tip of the robot is moved. Where "Q3" represents a current position of the robot, i.e., a position of the tip coordinate system relative to the robot coordinate system, and "Pj" represents positional information of the vision target jig 72 in the tip coordinate system, which is stored in the calibration data storage unit 54, the current placement information P3 of the vision target jig 72 viewed from the robot coordinate system can be calculated by the following equation (4):

$$P3 = Q3 \times Pj \quad (4).$$

Accordingly, the display device 20 of the robot system 80 graphically displays the vision target jig 72 in a virtual three-dimensional space, based on the current placement information P3 of the vision target jig 72 in the robot coordinate system and the shape information of the vision target jig 72 stored in the shape-arrangement information storage unit 22.

Figure 8:
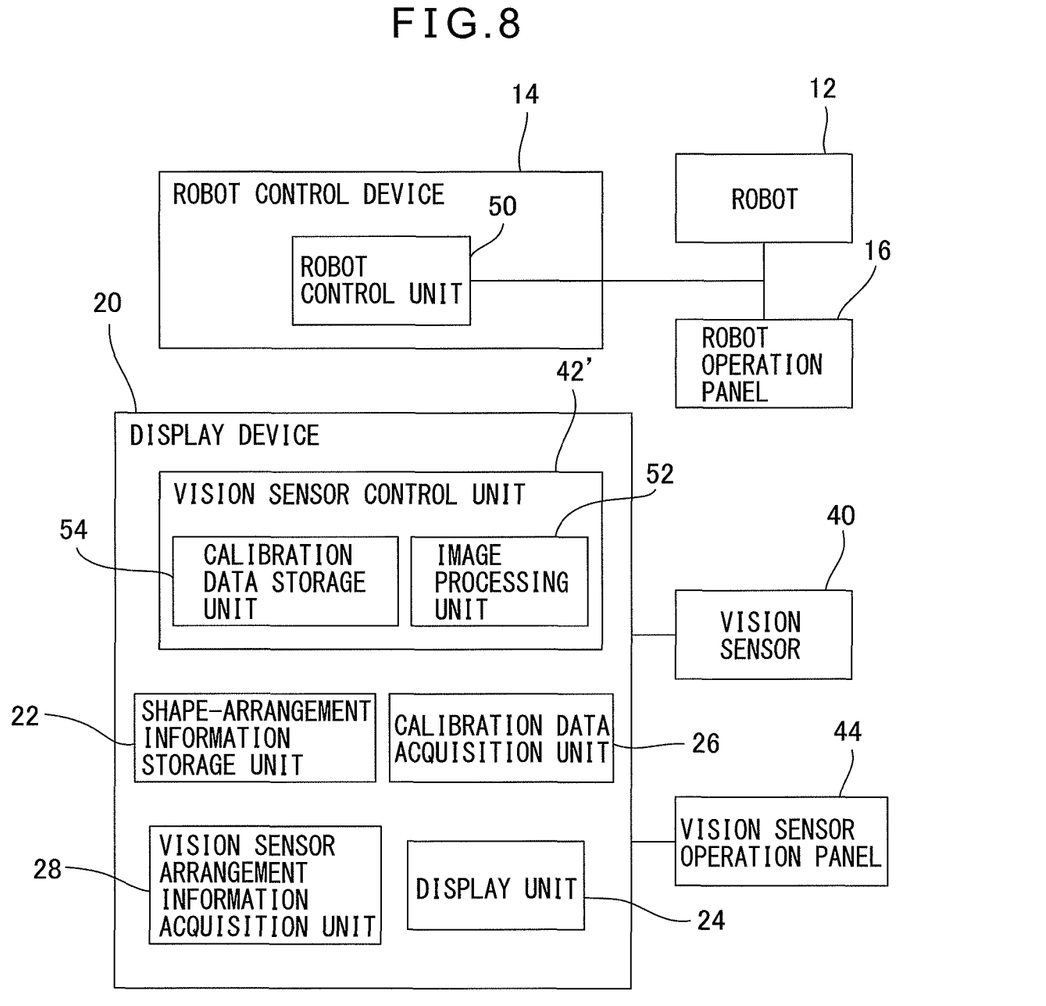
FIG. 8 is a functional block diagram of a robot system and a display device for the robot system according to a first variant.

FIG. 8 is a functional block diagram of a robot system and a robot system display device 20 according to a first variant. According to this variant, the robot system display device 20 may function as the vision sensor control device 42. In other words, the display device 20 is a digital computer which includes a shape-arrangement information storage unit 22, a display unit 24, a calibration data acquisition unit 26, a vision sensor arrangement information acquisition unit 28, and a vision sensor control unit 42'. The individual components of the display device 20 are connected to one another via a bus. The vision sensor control unit 42' further includes an image processing unit 52 and a calibration data storage unit 54. The calibration data storage unit 54 and the shape-arrangement information storage unit 22 may be integrated into a single storage unit.

A vision sensor operation panel 44 is connected to the vision sensor control unit 42' of the display device 20 via a communication cable. An operator may operate the vision sensor operation panel 44 to carry out a setup necessary for measuring a target object 30 by using the vision sensor 40. In one embodiment, the vision sensor operation panel 44 may also serve as the display unit 24 such as a liquid crystal display.

Figure 9:
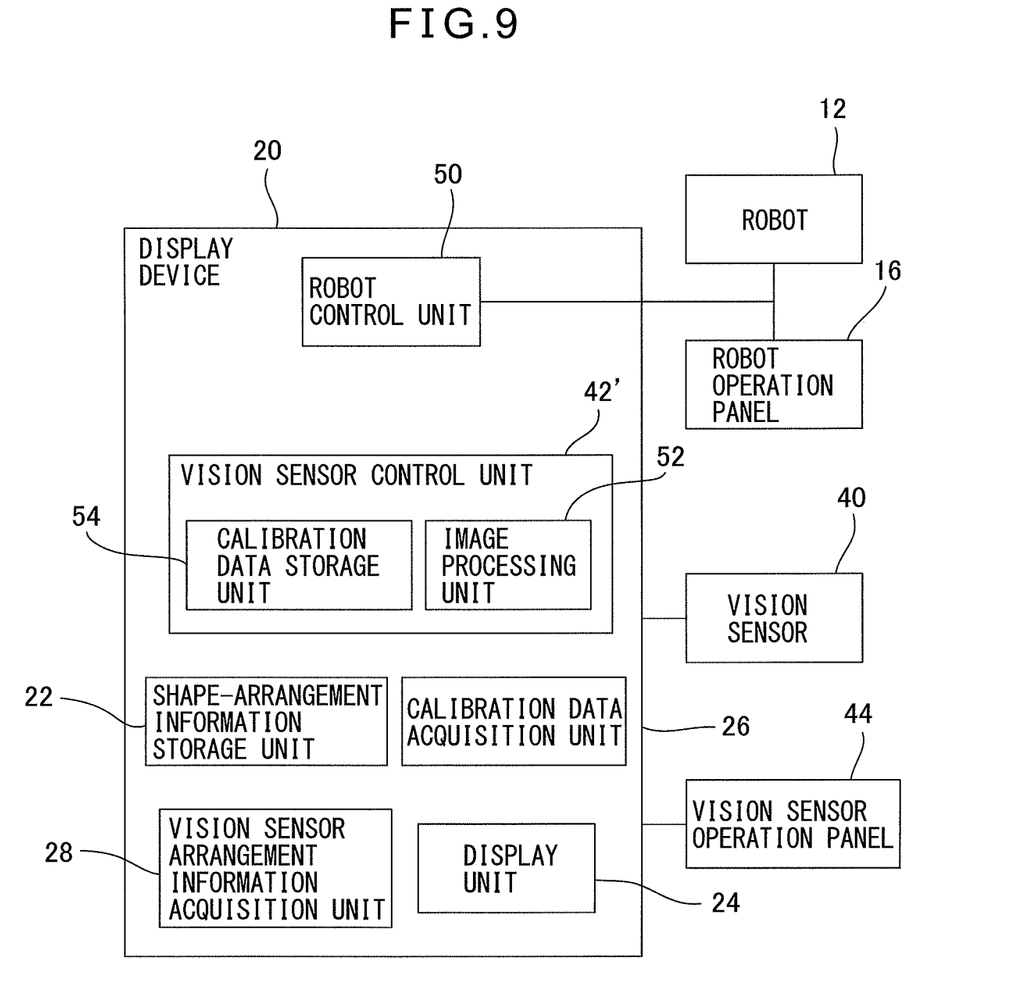
FIG. 9 is a functional block diagram of a robot system and a display device for the robot system according to a second variant.

FIG. 9 is a functional block diagram of a robot system and a robot system display device according to a second variant. According to this variant, a display device 20 has a function as the robot control device 14. Further, the display device 20 also has a function as the vision sensor control device 42. In other words, the display device 20 is a digital computer which includes a shape-arrangement information storage unit 22, a display unit 24, a calibration data acquisition unit 26, a vision sensor arrangement information acquisition unit 28, a robot control unit 50, and a vision sensor control unit 42'. The respective components of the display device 20 are connected to one another via a bus.

A robot operation panel 16 is connected to the robot control unit 50 of the display device 20 via a communication cable. An operator may operate the robot operation panel 16 to control movement of the robot 12 and perform a setup necessary for processing imaged data of a target object 30 by means of an image processing unit 52 incorporated in the display device 20. In one embodiment, the robot operation panel 16 may also incorporate the display unit 24 configured from a liquid crystal display (LCD) or the like. Further, the robot operation panel 16 and the vision sensor operation panel 44 may be integrated into a single operation panel.

EFFECT OF THE INVENTION

According to the robot system display device configured as described above, when calibration data include errors, a vision sensor is displayed in a position/posture different from the actual one. This allows an operator to easily and visually check whether there is an error in the calibration data.

The above described embodiments and the variant thereof are explained for the illustrative purpose only. It goes without saying that an embodiment which is not explicitly described herein are intended to fall within the scope of the present invention as long as such an embodiment realizes the same function and result as a whole. Further, it is obvious for those skilled in the art that it is possible to embody the present invention by combining any of features of the embodiments explicitly or implicitly described in the specification.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A robot system display device comprising:
   a storage unit for storing shape information and arrangement information of components of a robot system; and
   a display unit for graphically displaying the components of the robot system based on the shape information and the arrangement information of the components stored by the storage unit,
   wherein the robot system at least comprises a robot and a vision sensor,
   wherein the robot system display device further comprises:
      a first acquisition unit for acquiring calibration data for associating a robot coordinate system which is a reference for an operation control of the robot and a vision sensor coordinate system which is a reference for a measurement process of the vision sensor with each other; and
      a second acquisition unit for acquiring arrangement information of the vision sensor based on the calibration data acquired by the first acquisition unit and shape information of the vision sensor stored by the storage unit,
      wherein the display unit is adapted to display the vision sensor, based on the shape information of the vision sensor stored by the storage unit and the arrangement information of the vision sensor acquired by the second acquisition unit.

2. The robot system display device according to claim 1,
   wherein the vision sensor is fixed to an arm of the robot so as to move together with the arm and maintain an arrangement relationship with the arm, and
   wherein the display unit is adapted to graphically display the vision sensor based on the arrangement relationship between the arm and the vision sensor.

3. The robot system display device according to claim 1,
   wherein the robot system further comprises a vision target jig,
   wherein the calibration data acquired by the first acquisition unit further associates the robot coordinate system, the vision sensor coordinate system and the vision target jig with one another, and
   wherein the robot system display device further comprises a third acquisition unit for acquiring arrangement information of the vision target jig based on the calibration data, and
   wherein the display unit is adapted to graphically display the vision target jig, based on shape information of the vision target jig stored by the storage unit and the arrangement information of the vision target jig acquired by the third acquisition unit.

4. The robot system display device according to claim 1,
   wherein the robot system further comprises a vision target jig which is fixed to an arm of the robot so as to move together with the arm of the robot and maintain an arrangement relationship with the arm,
   wherein the calibration data acquired by the first acquisition unit further associates the robot coordinate system, the vision sensor coordinate system and the vision target jig with one another,
   wherein the robot system display device further comprises a third acquisition unit for acquiring arrangement information of the vision target jig based on the calibration data, and
   wherein the display unit is adapted to graphically display the vision target jig based on shape information of the vision target jig stored by the storage unit and the arrangement relationship between the arm and the vision target jig, which is obtained from the arrangement information of the vision target jig acquired by the third acquisition unit.

5. The robot system display device according to claim 1, wherein the shape information of the components of the robot system stored by the storage unit is three-dimensional shape information.

6. The robot system display device according to claim 1, comprising a vision sensor control device for controlling the vision sensor.

7. The robot system display device according to claim 1, comprising a robot control device for controlling the robot.

8. The robot system display device according to claim 1, wherein when the vision sensor is properly calibrated, the vision sensor is displayed on the display unit at a correct position in relation to other components.

* * * * *